United States Patent [19]

Nagata et al.

[11] Patent Number: 5,057,913
[45] Date of Patent: Oct. 15, 1991

[54] HARD COPY SIMULATOR WITH STORED DATA TO CORRECT FOR LIGHTING CONDITIONS

[75] Inventors: Yoshikatsu Nagata; Kazuo Shiota, both of Kanagawa, Japan

[73] Assignee: Fuji Photo Film Co., Ltd., Kanagawa, Japan

[21] Appl. No.: 368,639

[22] Filed: Jun. 20, 1989

[30] Foreign Application Priority Data

Jun. 20, 1988 [JP] Japan .................. 63-151834

[51] Int. Cl.$^5$ .................. H04N 1/21; H04N 1/23; H04N 1/46
[52] U.S. Cl. .................. 358/302; 358/76; 358/78; 358/80; 346/110 R; 355/32
[58] Field of Search .................. 358/302, 75, 76, 78, 358/80, 29; 355/32; 346/107 R, 110 R

[56] References Cited

U.S. PATENT DOCUMENTS

| | | | |
|---|---|---|---|
| 3,315,029 | 4/1967 | Suhrmann | 358/29 |
| 4,736,244 | 4/1988 | Shiota | 358/80 |
| 4,742,387 | 5/1988 | Oshima | 358/29 |
| 4,780,756 | 10/1988 | Shiota | 358/78 |
| 4,794,460 | 12/1988 | Shiota | 358/332 |
| 4,849,809 | 7/1989 | Tahara | 358/75 |
| 4,875,071 | 10/1989 | Shiota | 355/20 |
| 4,893,178 | 1/1990 | Matama | 358/80 |

Primary Examiner—Benjamin R. Fuller
Assistant Examiner—Scott A. Rogers
Attorney, Agent, or Firm—Sughrue, Mion, Zinn, Macpeak & Seas

[57] ABSTRACT

A simulator simulates a hard copy to be made and displays an image thereof on a color monitor. In such a simulation, a lighting condition correction unit corrects a video signal in accordance with the lighting conditions where the color monitor is installed. The color balance and density of the simulated image under an illumination thus are the same as the hard copy to be made.

13 Claims, 3 Drawing Sheets

HARD COPY SIMULATOR WITH STORED DATA TO CORRECT FOR LIGHTING CONDITIONS

BACKGROUND OF THE INVENTION

The present invention relates to a hard copy simulator, and, more particularly, to a hard copy simulator for displaying an image simulating a finished hard copy, the simulator taking into account the illumination state in working environments.

A hard copy apparatus containing a built-in simulator, such as a photographic printer, ink jet printer, laser printer, and the like is well-known in the art. With such a hard copy apparatus, an image simulating the finished hard copy is displayed on a color monitor to check the hard copy quality prior to producing a hard copy of the image. If the finished hard copy quality is anticipated to be unsatisfactory, it may be corrected by a keyboard.

Generally, a color monitor for inspecting installed finished hard copy quality, situated in a bright working room, is used for improving work efficiency. However, if the lighting conditions within a working room are different (e.g., in color temperature) from the standard inspection light source, a simulated hard copy image on a color monitor hard copy will be different from an actual finished hard copy, resulting in improper inspections.

Therefore, it is a principal object of the present invention to provide a hard copy simulator capable of displaying an image simulating the hard copy corrected according to the work environment illumination state.

It is another object of the present invention to provide a hard copy simulator allowing correct inspection of finished hard copy quality.

SUMMARY OF THE INVENTION

In order to achieve the above objects of the present invention, the capability is provided for correcting a simulated image displayed on a color monitor, according to lighting conditions in a work area where the color monitor is installed. Preferably, the correction capability uses a table look-up memory containing data, more preferably, for respective types of illumination light sources, so that table data can be selectively used so as to obtain a hard copy identical to the simulating image.

According to the present invention, the finished hard copy quality can be inspected by monitoring a simulated image which is not substantially affected by lighting conditions since a simulated image is corrected according to the lighting conditions in the work area where a color monitor is installed. Consequently, even in a work environment using an artificial light source, a correct inspection can be performed resulting in a hard copy being formed having proper color balance.

BRIEF DESCRIPTION OF THE DRAWINGS

The above and other objects, features, and advantages of this invention will become more apparent from the following detailed description when read in conjunction with the accompanying drawings, in which.

DETAILED DESCRIPTION OF THE PREFERRED EMBODIMENTS

Figure 1:
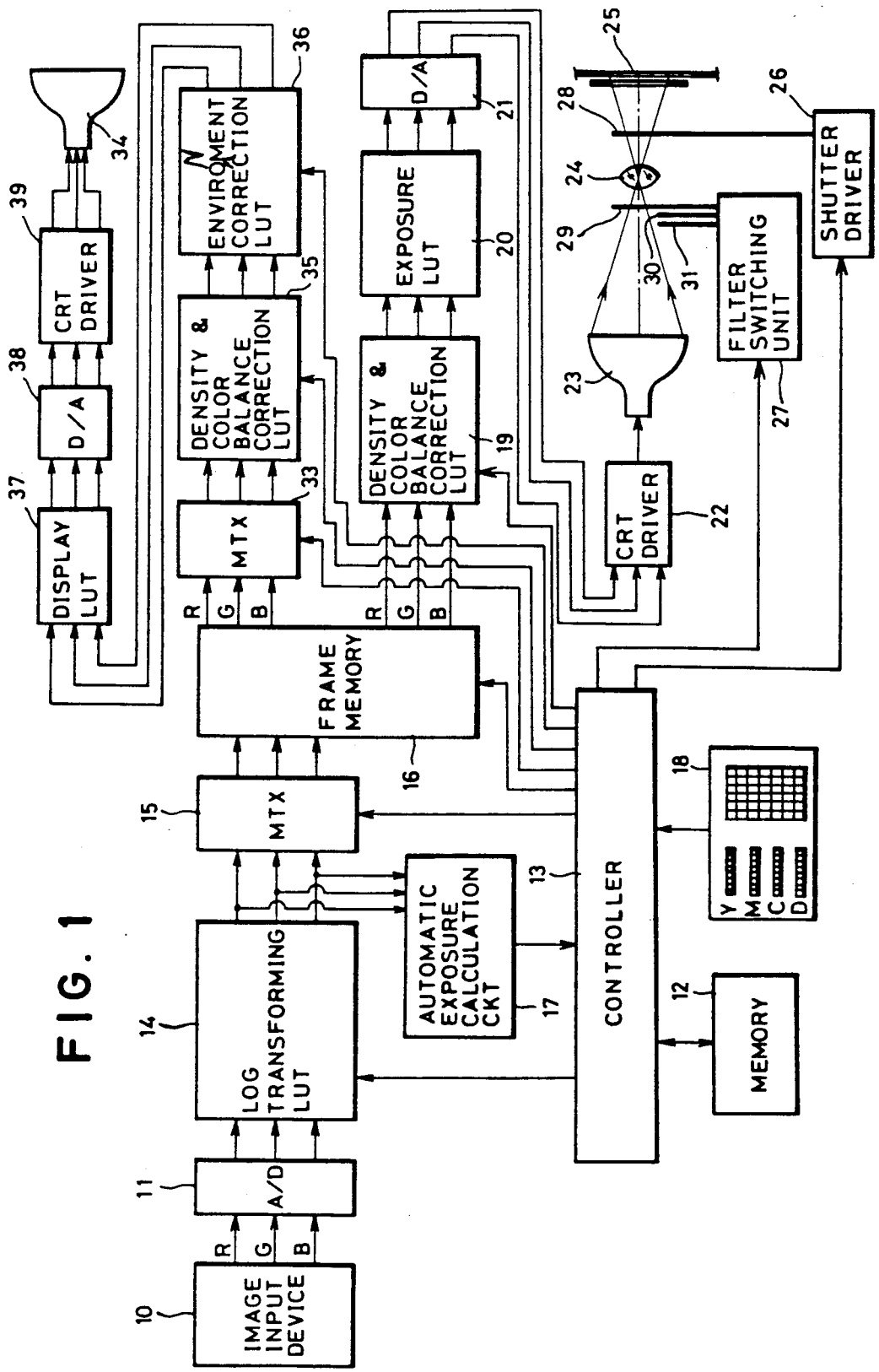
FIG. 1 is a schematic block diagram showing the structure of a color video printer embodying the present invention.

FIG. 1 shows a video printer embodying the present invention in which an image input device 10 is constructed of, for example, a video tape reproducing unit, a color video camera, or the like. The image input device 10 is supplied with red (R). green (G), and blue (B) color video signals of a positive image of an object or a photographic print. These color video signals are supplied to analog/digital (A/D) converters 11 provided, respectively, for different color video signals, and are converted into digital signals. The digital signals are inputted to a logarithmic conversion look-up table memory (LUT) 14 to be converted logarithmically into density (strictly speaking, logarithmic conversion value) signals.

Figure 2:
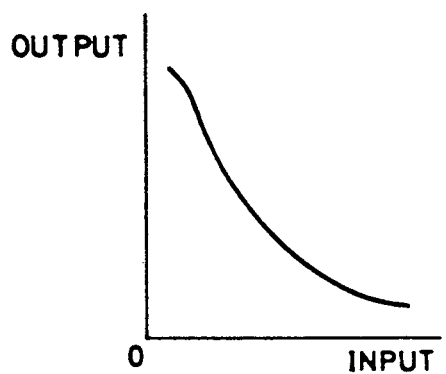
FIGS. 2 through 6 are graphs showing the characteristics of data stored in the look-up tables shown in FIG. 1.

FIG. 2 shows an example of the characteristics of table data stored in LUT 14. If the image input device 10 has inputted a negative image, such as that of a color negative film, the table data shown in FIG. 2 are used by reversing the data, and the negative-to-positive conversion is performed simultaneously with the logarithmic conversion.

The density signals outputted from LUT 14 are sent to a matrix calculation circuit 15 for color correction by a known matrix (three rows and three columns) formula. With this color correction, the difference between the spectral characteristics of a color paper and the spectral sensitivity of a color television is corrected. The density signals color-corrected by the matrix calculation circuit 15 are written in a frame memory 16 provided for the respective colors.

The density signals outputted from LUT 14 also are sent to an automatic exposure calculation circuit 17 in which the exposure amount is calculated based on, for example, an average transmittance density (LATD) value, maximum and minimum values, or the like. The calculated exposure amount is sent to a controller 13. Depending upon the exposure amount, reference table data stored in density/color balance correction LUTs 19 and 35 in the CRT exposure system and in the simulator system, respectively, are shifted, and again are written in LUTs 19 and 35 under the control of the controller 13.

Figure 3:
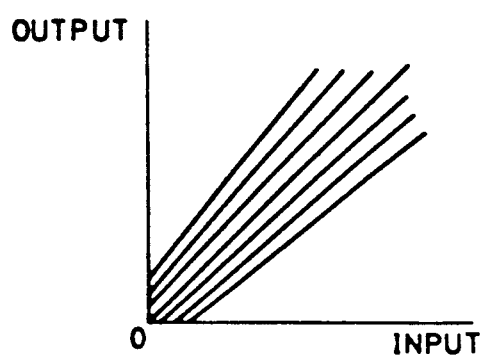

The density signals written in the frame memory 16 are read in response to a read signal sent from the controller 13, and are sent to the CRT exposure system and to the simulator system. In the CRT exposure system, the density or color balance of each print frame is corrected using the density/color balance correction LUT 19 provided for the respective colors. Such density/color balance correction is performed so that the correction amount is determined empirically while monitoring a simulated image on a monitor CRT 34. The determined correction amount is inputted via color correction keys 18a, 18b, and 18c, or density correction key 18d. Then, reference table data stored in a memory 12 are shifted by the correction amount, or multiplied by a correction coefficient, to obtain correction table data which are written in LUT 19. FIG. 3 shows an example of the correction table data set.

Figure 4:
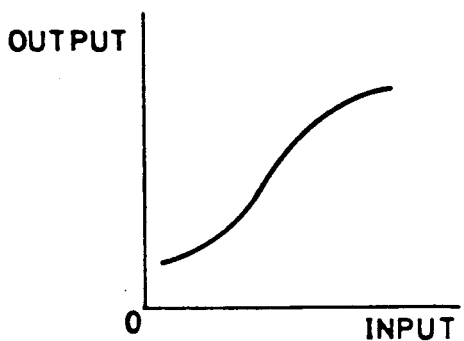

The density signals corrected by the density/color balance LUT 19 undergo data conversion by an exposure LUT 20. FIG. 4 shows an example of this table data, which are determined while considering the light emission characteristics of an exposure CRT 23 and the color characteristics of a color paper 25. The density signals subjected to data conversion by the exposure LUT 20 are further subjected to positive/negative conversion. Thereafter, the density signals are converted into analog signals by a D/A converter 21, and then are sent to a CRT driver 22. The CRT driver 22 drives the monochrome exposure CRT 23 under the control of the controller 13 upon pressing a print key on a keyboard 18.

An image displayed on the exposure CRT 23 is focussed via a printing lens 24 onto the color photographic paper 25 set on an exposure stage while a shutter 28 is opened by a shutter driver 26. In order to change a monochrome image displayed on the exposure CRT 23 to a red, green, or blue image, a red filter 29, green filter 30, and blue filter 31 are provided, respectively, one of which is selected by a filter switching unit 27 and inserted into a printing optical path.

In the simulator system, the density signals written in the frame memory 16 are read under the control of the controller 13, and are sent to a matrix calculation circuit 33 provided for respective colors for correction of the color monitor characteristics. The matrix calculation circuit 33 performs color correction, thereby enabling the light emission characteristics of the color monitor CRT 34 to match the color characteristics of the color paper 25.

The density signals corrected by the matrix calculation circuit 33 are sent to the density/color balance correction LUT 35 provided for respective colors for correction of density/color balance, according to the determined correction data. This correction performed in the simulator system corresponds to the correction performed by the density/color balance correction LUT 19 in the CRT exposure system.

Figure 5:
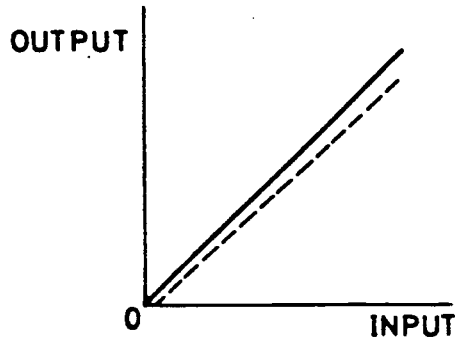

The corrected density signals are sent to an environment correction LUT 36 for correction according to the lighting conditions of the work area where the monitor CRT 34 is installed. This correction is performed allowing a reference image to be printed for test purposes. Then, the color tone of the test print photograph is compared with that of the displayed image on the monitor CRT 34 to determine empirically the correction amount which is then inputted via the keyboard 18. This actuates the keyboard 18 to enter an environment correction mode, and the correction amount is inputted with the correction keys 18a through 18d. The controller 13 causes the reference table data to shift according to the inputted correction amount so that the work area's lighting conditions are matched, and also causes the shifted table data to be written in the environment correction LUT 36. FIG. 5 shows an example of the table data written in the environment correction LUT 36. The table data are those data selected from the table data shown in FIG. 3 according to the correction amount.

Figure 6:
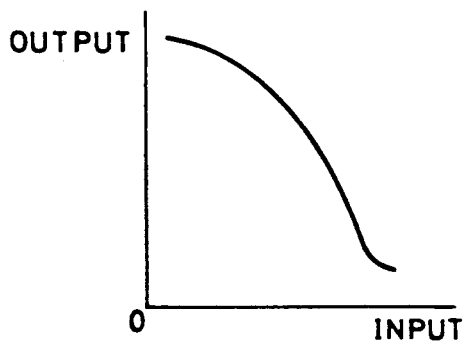

The image signal corrected by the environment correction LUT 36 is subjected to data conversion by using the table data in a display LUT 37 so that a simulated image having the same gradation as the finished print can be displayed on the monitor CRT 34. The table data are determined in accordance with the measured data under the standard environment condition. FIG. 6 shows an example of this table data. The table data in LUT 37 are determined such that the brightness/chromaticity of a test pattern image having stepwise gradations at the respective areas, and displayed on the monitor CRT 34, is the same as for the finished print. The brightness/chromaticity is measured with a spectral luminance meter and a density meter. Thus, a grey spot on the print can be displayed on the monitor CRT 34 as a spot having a chromaticity of a standard white light source.

White color on the monitor CRT 34 being sensed by a person is affected by the conditions within the field of view outside of the monitor CRT 34 screen. Therefore, even a spot having a chromaticity of a standard white light source and displayed on the monitor CRT 34 is not sensed as white, if, for example, the work area lighting condition's color temperature is low. Rather, the spot is sensed as being somewhat cyan. In this case, correcting the display chromaticity of the spot to become somewhat red is required so that a proper inspection results for a simulated image displayed on the monitor CRT 34. The environment correction LUT 36 makes such a correction possible.

The image signal corrected by the display LUT 37 is converted into an analog signal by a digital/analog (D/A) converter 38, and thereafter, sent to a CRT driver 39. The CRT driver 39 drives the monitor CRT 34 which displays a color image simulating a finished print photograph.

The controller 13 includes a microcomputer, and updates the table data in LUTs 14, 19, 20, 35, 36, and 37, correction coefficients, and the like of the formulas used by the matrix calculation circuits 15 and 33, according to the correction amount inputted by the keyboard 18. The controller 13 also controls the shutter driver 26 and filter switching unit 27.

The embodiment described above is operated by turning on the apparatus. The controller 13 thereby initializes the data in the frame memory 16, matrix calculation circuits 15 and 33. LUTs 14, 20, 35, 36, and 37 according to the memory 12 contents, and actuates associated circuitries. The type of color photographic paper 25 to be used by the video printer is inputted to the controller 13 by a paper type input key of the keyboard 18, and the controller 13 writes the coefficient data of the matrices used by the matrix operation circuit 15 according to the paper type information.

The video printer corrects the image according to the work area lighting conditions such that the monitor CRT 34 of the simulator system displays an image with the same characteristics as the print photograph. Reference data are set at LUTs and the like, and a reference video image is printed on a color photographic paper 25. The reference data then are shifted according to the work area lighting conditions so that the image displayed has the same color tone as the test print image. The shifted data are written in the environment correction LUT 36.

After writing data in the environment correction LUT 36, an inspection mode is entered by pressing an inspection key. The image data inputted by the image input device 10 are processed by LUTs 14, 35, 36 and 37, matrix calculation circuits 15 and 33, and the like. The color balance/density is corrected according to the exposure amount calculated by the automatic exposure amount calculation circuit 17. A color image simulating a print photograph is displayed on the monitor CRT 34. The operator inspects the density/color balance while monitoring the color image displayed on the monitor CRT. The density/color balance is corrected, if necessary, by the correction keys 18a through 18d. Upon correction, the correction table data in the density/color balance correction LUTs 20 and 33, of the CRT exposure system and simulator system, respectively, are converted into the table data by shifting the reference table data by the correction amount. Thus, a color image, simulating a finished print photograph after manual correction, is displayed on the monitor CRT 34. If the manual correction still is not sufficient, the correction keys 18a through 18d are actuated again for another correction cycle.

If the finished simulated image is deemed proper, a print key is depressed to start printing and perform exposure of one frame of the color photographic paper 25. That is, the image signals for respective colors sequentially read out from the frame memory 16 are corrected by the density/color balance correction LUT 19, and the CRT driver 22 drives the monochrome exposure CRT 23 according to the corrected image signals. The red, green, and blue components of the negative image are displayed sequentially in black-and-white on the exposure CRT 23. While a black-and-white monochromatic color image is displayed on CRT 23, a corresponding color filter 29, 30, or 31, is inserted into the optical printing path to convert the image into a red, green, or blue image, respectively, thus performing an additive three color plane sequential exposure.

Figure 7:
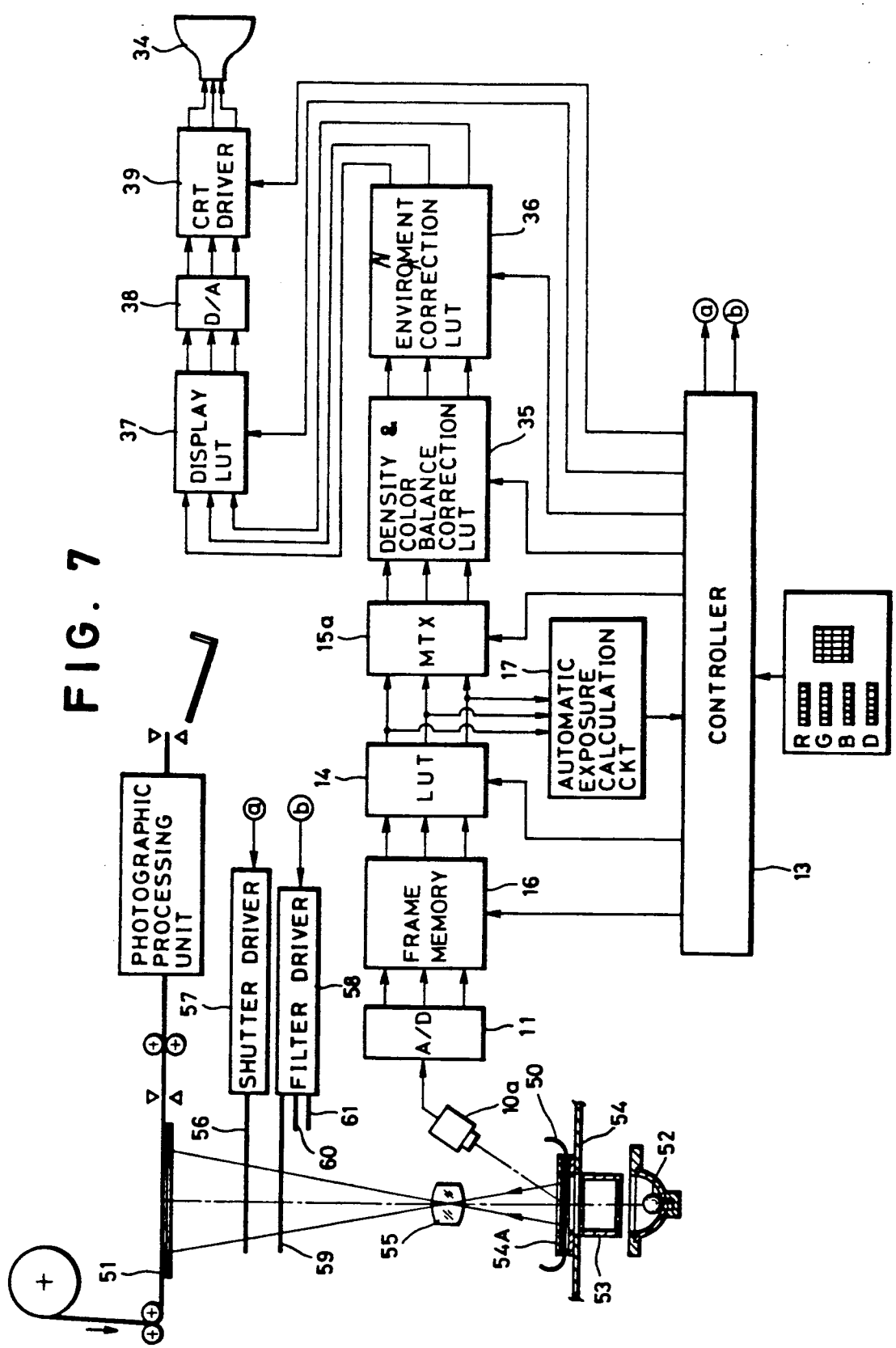
FIG. 7 is a schematic block diagram showing the structure of a second embodiment of the photographic printer according to the present invention.

In the above embodiment, a simulator is built into the video printer. The present invention is not limited thereto, but a simulator may be mounted on a photographic printer for printing a photographic paper 51, as shown in FIG. 7, in the second embodiment of the invention. The simulator system is substantially the same as in the first embodiment except for the removal of the CRT exposure system. Like circuits have been represented by using identical reference numerals, with the description therefor being omitted.

A negative image of the negative film 50 is picked up, for example, by a color television camera 10a. Three color image signals are obtained and are written in a frame memory 16 via an A/D converter 11 for each separated color. The image signals from the frame memory 16 undergo logarithmic conversion and negative/positive conversion by LUT 14 simultaneously, and are sent to an automatic exposure amount calculation circuit 17. According to each color exposure amount calculated by the automatic exposure amount calculation circuit 17, a controller 13 rewrites the table data in a density/color balance LUT 35, and controls a filter driver 58 and an exposure time for each color. The density signals from LUT 14 are color-corrected by a matrix calculation circuit 15a provided for the respective colors. This color-correction eliminates the difference between the spectral sensitivity of the color television camera 10c and the light emission characteristics of the monitor CRT 34.

If necessary, the density signals corrected by the matrix calculation circuit 15a have each print frame corrected by density/color balance manner similar to the first embodiment, by a density/color balance correction LUT 35 provided for respective colors. Thereafter, the density signals are sent to an environment correction LUT 36 where they are corrected according to the lighting conditions of the work area where the monitor CRT 34 is installed.

The density signals corrected by the environment correction LUT 36 are corrected further by a display LUT 37. Thereafter, the corrected density signals are converted into analog signals by a D/A converter 38, and are sent to a CRT driver 39. The CRT driver 39 drives the monitor CRT 34 which thereby displays a color image simulating a finished print photograph on its screen.

The photographic image exposure system is described below. White light projected from a white light source 52 passes through a mixing box 53 and film carrier 54, and reaches a negative film 50 set at the printing stage to illuminate the film from the underside thereof. The mixing box 53 is constructed of a rectangular tube with its inner surface formed with a mirror plane, and diffusion plates mounted on opposite openings. The negative film 50 is placed on the film carrier 54 and is pushed downward with a mask 54A.

Above the film carrier 54, a zoom lens 55 is provided for focussing the negative image of the negative film 50 onto the color photographic paper 51 set on the exposure stage while a shutter 56 is opened. The shutter 56 is controlled by shutter driver 57 such that it opens for a time corresponding to the sensitivity of the color photographic paper 51 and the condition of the negative image.

A cyan filter 59, magenta filter 60, and yellow filter 61 for a subtractive color print are disposed between the shutter 56 and zoom lens 55. A filter driver 58 is controlled by the controller 13 so that, for example, after the lapse of exposure time for a red color, the cyan filter 59 of the complementary color is inserted into the optical printing path to thus terminate red color exposure.

The second embodiment operates by image data being sent from the television camera 10a to the A/D converter 11 where they are converted into digital signals and written in the frame memory 16. The image signals written in the frame memory 16 are converted into density signals by LUT 14, and, thereafter, are color-corrected by the matrix calculation circuit 15c. The color-corrected image data also are corrected by density/color balance for each print frame by the density/color balance correction LUT 35. Next, the image data are corrected by the environment correction LUT 36 according to the work area lighting conditions, and, thereafter, undergo gradation correction by the display LUT 37. The corrected image signals are converted into analog signals at the D/A converter 38, and sent to the CRT driver 39 which drives CRT 34 according to the image data to thereby display a color image having the same color balance/density as the print photograph.

As described above, the operator inspects a finished print condition while monitoring the simulated image displayed on the color monitor CRT 34, and, if necessary, performs density/color balance correction. Since the simulated image has been corrected according to the work area lighting conditions, an image having the same color tone as the print photograph can be monitored so that precise inspections result even if an artificial light source is used in the work environment.

After inspecting a finished print condition, the operator depresses a print key to start printing. According to the exposure amount for each color calculated by the automatic exposure amount calculation circuit 17, or according to the corrected exposure amount, the controller 13 controls the timing of when each color filter 59, 60, or 61 is to be inserted into the optical path, so that each color's exposure time is adjusted. This guarantees a print photograph having a proper color balance and density.

Thus, in the second embodiment, exposure time has been controlled. However, each color's filter insertion amount may be controlled for the exposure control.

In the above embodiments, the color balance correction LUT 35, environment correction LUT 36, and display LUT 37 of the simulator system have been provided separately. However, the present invention is not limited thereto, and a single LUT may be used for all three types of corrections.

Furthermore, the invention has been described using a configuration of a video printer and photographic printing apparatus as an example. The present invention is also applicable to other hard copy apparatuses such as ink jet printers, laser printers, and the like. Furthermore, the present invention may be embodied as a unit type simulator capable of being configured with another discrete printer. Additionally, different types of monitors may be used, including color liquid crystal displays as well as color CRT displays.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A hard copy simulator comprising:
   means for simulating a hard copy to be made;
   a color monitor for displaying a simulated image simulating said hard copy; and
   correction means for correcting said simulated image, said correction means comprising:
   first means for storing a first look-up table containing data on lighting conditions where said color monitor is installed;
   second means for storing a second look-up table containing data on density and color balance for said simulated image; and
   means for correcting said simulated image in accordance with said lighting conditions where said color monitor is installed based on a content of said first means independently of said second means.

2. A hard copy simulator according to claim 1, wherein said correction means comprises a look-up table memory storing signal conversion table data.

3. A hard copy simulator according to claim 2, wherein said color monitor comprises a color CRT.

4. A hard copy simulator according to claim 2, wherein said color monitor comprises a liquid crystal display device.

5. A hard copy simulator according to claim 3, further comprising means for storing a plurality of table data for respective types of light sources, such that, among said plurality of table data, only those table data allowing the same condition of a hard copy made through test printing and the simulated image thereof, are written in said look-up table memory.

6. A hard copy simulator according to claim 4, further comprising means for storing a plurality of table data for respective types of light sources, such that, among said plurality of table data, only those table data allowing the same condition of a hard copy made through test printing and the simulated image thereof, are written in said look-up table memory.

7. A video printer comprising:
   a memory for storing an inputted color video signal;
   image processing means for processing said color video signal read out from said memory;
   a monochrome CRT driven by said color video signal outputted from said image processing means for displaying a red image, green image, and blue image in black-and-white, and projecting a black-and-white image for printing onto a color photographic paper;
   three primary color filters, disposed between said monochrome CRT and said color photographic paper, for converting said black-and-white image projected from said monochrome CRT into a monochromatic image;
   means for processing said color video signal read out from said memory and simulating a color image to be printed on said color photographic paper to provide a simulated image;
   a color monitor for displaying said simulated image; and
   correction means for correcting said simulated image, said correction means comprising:
   first means for storing a first look-up table containing data on lighting conditions where said color monitor is installed;
   second means for storing a second look-up table containing data on density and color balance for said simulated image; and
   means for correcting said simulated image in accordance with the lighting conditions where said color monitor is installed based on a content of said first means independently of said second means.

8. A video printer according to claim 7, wherein said color monitor comprises a color CRT.

9. A video printer according to claim 7, wherein said color monitor comprises a liquid crystal display device.

10. A photographic printer comprising:
    a photographic printing system for printing an image of a photographic film on a color photographic paper;
    a color TV camera for picking up the image of said photographic film and outputting a color video signal;
    means for processing said color video signal to simulate a color image to be recorded on said color photographic paper and provide a simulated image;
    a color monitor for displaying said simulated image; and
    correction means for correcting said simulated image, said correction means comprising:
    first means for storing a first look-up table containing data on lighting conditions where said color monitor is installed;
    second means for storing a second look-up table containing data on density and color balance for said simulated image; and
    means for correcting said simulated image in accordance with the lighting conditions where said color monitor is installed based on a content of said first means independently of said second means.

11. A photographic printer according to claim 10, further comprising a memory for storing said color video signal outputted from said color television camera.

12. A photographic printer according to claim 11, wherein said color monitor comprises a color CRT.

13. A photographic printer according to claim 11, wherein said color monitor comprises a liquid crystal device.

* * * * *